United States Patent [19]

Nishikawa et al.

[11] Patent Number: 5,416,123
[45] Date of Patent: May 16, 1995

[54] POLYURETHANE FOAM PREPARED FROM HIGH CONCENTRATION-LOW VISCOSITY POLYMER-POLYOL

[75] Inventors: Ariko Nishikawa; Tamotsu Kunihiro; Tsukuru Izukawa; Kiyotsugu Asai, all of Aichi, Japan

[73] Assignee: Mitsui Toatsu Chemicals, Inc., Tokyo, Japan

[21] Appl. No.: 233,945

[22] Filed: Apr. 28, 1994

Related U.S. Application Data

[62] Division of Ser. No. 960,681, Oct. 14, 1992, Pat. No. 5,324,774.

[30] Foreign Application Priority Data

Oct. 14, 1991 [JP] Japan ................................ 3-264405
Aug. 31, 1992 [JP] Japan ................................ 4-231116

[51] Int. Cl.⁶ .......................... C08J 9/04; C08J 9/14; C08L 75/08; C08G 18/48
[52] U.S. Cl. .................................. 521/137; 521/110; 521/124; 521/129; 521/131; 521/174; 521/176
[58] Field of Search ............... 521/110, 124, 129, 131, 521/174, 176, 137

[56] References Cited

U.S. PATENT DOCUMENTS

| | | | |
|---|---|---|---|
| 3,953,393 | 4/1976 | Ramlow et al. | 525/43 |
| 4,661,531 | 4/1987 | Davis et al. | 521/137 |
| 4,689,354 | 8/1987 | Ramlow et al. | 521/137 |
| 4,690,956 | 9/1987 | Ramlow et al. | 521/137 |
| 5,300,535 | 4/1994 | Takeyasu et al. | 521/137 |
| 5,324,774 | 6/1994 | Nishikawa et al. | 524/762 |

Primary Examiner—John Kight, III
Assistant Examiner—Rabon Sergent
Attorney, Agent, or Firm—Burns, Doane, Swecker & Mathis

[57] ABSTRACT

High concentration-low viscosity polymer-polyols are prepared by polymerizing mixtures of acrylonitrile and styrene in polyols, which are free of any polymerizable carbon-carbon double bond, in the presence of alkyl-substituted tertiary amines. Without use, as a dispersion stabilizer, of organic compounds which have a polymerizable carbon-carbon double bond and terminal hydroxyl groups, there can be obtained polymer-polyols which have a concentration of the polymer of 33–60 wt % and a glass transition temperature of the polymer of 90°–120° C.

11 Claims, No Drawings

POLYURETHANE FOAM PREPARED FROM HIGH CONCENTRATION-LOW VISCOSITY POLYMER-POLYOL

This application is a divisional of application Ser. No. 07/960,681, filed Oct. 14, 1992, now U.S. Pat. No. 5,324,774.

BACKGROUND OF THE INVENTION

1. Field of the Invention

This invention relates to a process for preparing polymer-polyols, polymer-polyols obtained by the process and polyurethane foams using the polymer-polyols. More particularly, the invention relates to a process for preparing polymer-polyols by polymerizing ethylenically unsaturated monomers in polyols free of any polymerizable carbon-carbon double bond in the presence of alkyl-substituted tertiary amines, to the polymer-polyols obtained by the process. and to polyurethane foams which are obtained by reaction between the polymer-polyols and polyisocyanates in the presence of foaming agents. catalysts, foam stabilizers and other additives.

2. Description of the Related Art

Processes for preparing polymer-polyols by polymerizing ethylenically unsaturated monomers in polyols are known in the art. Polymer-polyols are generally poor in dispersion stability and high in viscosity. To solve this, it is known to use chain transfer agents. There have been proposed processes wherein alkyl mercaptans are used as the chain transfer agent to obtain polymer-polyols with a low viscosity (U.S. Pat. No. 3,953,393 and Japanese Laid-open Patent Application No. 01-221403).

However. the polymer-polyols obtained by these processes have the problem of offensive odor. Moreover, because the rapid rise of viscosity cannot be suppressed when the concentration of the polymer is increased, it is difficult to obtain polymer-polyols of practical value.

Further, there has also been proposed a process which makes use of the chain transfer agents including mercaptans, ketones, alcohols, aldehydes, halogen compounds, benzene derivatives and, particularly, isopropyl alcohol (Japanese Laid-open Patent Application No. 58-210917). However, this process has to use large amounts of isopropyl alcohol in order to reduce the viscosity of a highly concentrated polymer-polyol. This leads to the problem that a large amount of energy is required for removing, purifying or collecting the alcohol.

Japanese Laid-open Patent Applications Nos. 50-149778 and 51-17924 set forth the use of organic compounds having a polymerizable carbon-carbon double bond and terminal hydroxyl groups as a dispersion stabilizer, which are apparently different from the present invention. Alternatively, there has been proposed a process wherein amines such as morpholine are used as a reaction regulator (Japanese Laid-open Patent Application No. 63-146912). In this process, however, a macromer containing an unsaturated bond consisting of a fumarate group is used as a dispersion stabilizer. This is completely different from the present invention. Although the use of the macromer is effective in stabilizing particles, there arises a problem of increasing the viscosity of the polyol. If morpholine which is a secondary amine is used, it is not possible to obtain polymer-polyols having good reaction curability.

OBJECTS AND SUMMARY OF THE INVENTION

An object of the invention is to provide a process for preparing polymer-polyols which have low viscosity and good dispersion stability in a highly concentrated condition, with improved reaction curability.

Another object of the invention is to provide polymer-polyols which are obtained by the above-mentioned process.

A further object of the invention is to provide polyurethane foams which have good physical properties such as hardness due to the use of the polymer-polyols.

Intensive studies have been made to achieve the above objects and, as a result. it has been found that when alkyl-substituted tertiary amines are used as a chain transfer agent and polyols which are tree of any polymerizable carbon-carbon double bond are employed, a given polymer concentration can be maintained with the glass transition temperature of the polymer being maintained within a specific range thereby achieving the above objects.

The aspects of the invention may be more particularly set forth as below.

One primary aspect of the invention is to provide a process for preparing high concentration-low viscosity polymer-polyols which is characterized by polymerizing an ethylenically unsaturated monomer in a polyol which is free of any polymerizable carbon-carbon double bond in the presence of an alkyl-substituted tertiary amine.

Another aspect of the invention is to provide a high concentration-low viscosity polymer-polyol which is prepared by the above-mentioned process and which does not contain any bond derived from a polymerizable carbon-carbon double bond.

A further aspect of the invention is to provide a polyurethane foam which is obtained by the reaction between the above polymer-polyol and a polyisocyanate in the presence of a foaming agent, a catalyst, a foam stabilizer and other additives.

DESCRIPTION OF THE PREFERRED EMBODIMENTS

The high concentration-low viscosity polymer-polyols of the invention are intended to mean polymer-polyols which are obtained by using polyols, ethylenically unsaturated monomers, chain transfer agents and catalysts for polymerization and subjecting them to a polymerization reaction.

The polyols used in the present invention are those polyols which are free of any polymerizable carbon-carbon double bond and should preferably have two to eight functionalities with a molecular weight per unit hydroxyl group ranging from 600 to 3000, preferably from 1000 to 2000. Examples include polyoxyalkylene polyols which are obtained by the addition reaction of one or more of alkylene oxides such as ethylene oxide, propylene oxide, butylene oxide and the like with one or more of diols such as ethylene glycol, diethylene glycol, propylene glycol, dipropylene glycol, 1,4-butylene glycol and the like, polyols such as glycerine, hexanetriol, trimethylolpropane, pentaerythritol, sorbitol, sucrose and the like, aromatic compounds such as bisphenol A, bisphenol F, dihydroxydiphenyl ether, dihydroxybiphenyl, hydroquinone, resorcin, phloroglucin, naphthalenediol, aminophenol, aminonaphthol, phenol-formaldehyde condensates and the like, and amine compounds such as methyldiethanolamine, ethyldiisopropanolamine, triethanolamine, ethylenediamine, hexamethylenediamine, bis(p-aminocylohexyl)methane, aniline, toluidine, tolylenediamine, diphenylmethanediamine, napthalenediamine and the like. Mixtures of two or more of these polyoxyalleylene polyols may also be used. Preferable polyols include polyoxyalkylene polyols obtained by addition of one or two of ethylene oxide and propylene oxide.

The ethylenically unsaturated monomers useful in the present invention should favorably have one polymerizable ethylenically unsaturated group. Specific examples include acrylonitrile, methacrylonitrile, styrene, methylstyrene, phenylstyrene and mixtures of two or more monomers. Preferably, there is mentioned acrylonitrile used singly or in combination with styrene. More preferably, a mixture of acrylonitrile and styrene is used.

The ratio by weight of acrylonitrile/styrene is 100/0–60/40, preferably 90/10–70/30.

The amount of the ethylenically unsaturated monomer is in the range of 33–60 wt %, preferably 33–49 wt %, based on the total of the polyol and the monomer. By this, the concentration of the resultant polymer can be maintained at a level of 33–60 wt %, preferably 33–49 wt %.

The alkyl-substituted tertiary amine used in the invention serves as a chain transfer agent. Examples of the alkyl-substituted tertiary amines include an alkyl-substituted amine of the general formula (1)

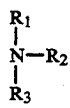
(1)

wherein $R_1$, $R_2$ and $R_3$ are an alkyl group having 1–10 carbon atoms and a hydroxyalkyl group having 2–10 carbon atoms and may be the same or different provided that at least one should represent an alkyl group having 1–10 carbon atoms, and an alkyl-substituted tertiary amine of the general formula (2)

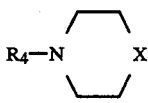
(2)

wherein X represents O or $NR_5$, $R_4$ represents an alkyl group having 1–10 carbon atoms or a hydroxyalkyl group having 2–10 carbon atoms, and $R_5$ represents an alkyl group having 1–10 carbon atoms or a hydroxyalkyl group having 2–10 carbon atoms. Specific examples suitable for use as the alkyl-substituted tertiary amine include triethylamine, tripropylamine, tributylamine, N-N-diethylethanolamine, N-methylmorpholine, N-ethylmorpholine and N,N'-diethylpiperazine.

The amount of the chain transfer agent is determined depending on the glass transition temperature of polymer which is controlled by means of the chain transfer agent. The chain transfer agent is used in such an amount that the glass transition temperature is in the range of 90°–120° C., preferably 95°–115° C. If the glass transition temperature is lower than 90° C., physical properties such as hardness are lowered on application as polyurethane foams. When the glass transition temperature exceeds 120° C., it is not possible to obtain polymer-polyols having an intended low viscosity. The amount of the chain transfer agent which enables such a glass transition temperature as set out above is one by which the molecular weight of the polymer is controlled within a range of 30000–140000. In practice, the amount ranges from 0.5 to 30 parts by weight, preferably from 1 to 20 parts by weight, per 100 parts by weight of the ethylenically unsaturated monomer.

The catalyst for polymerization useful in the present invention may be catalysts which are well known as a catalyst for a vinyl polymerization reaction. For instance, there are mentioned peroxides such as hydrogen peroxide, benzoyl peroxide, acetyl peroxide, t-butyl peroxide, di-t-butyl peroxide and the like, azo compounds such as azobisisobutyronitrile, and peroxo acids or salts thereof such as persulfates, persuccinic acid and the like.

The polymerization catalyst is added in an amount of 0.01–5 wt %, preferably 0.1–2.0 wt %, based on the total weight of the polyol and ethylenically unsaturated monomer.

In the practice of the invention, in order to stably disperse polymer particles, it is possible to effect the polymerization in the presence of a dispersion stabilizer such as polyoxypropylene polyol whose molecular weight is not lower than 15000. In this connection, however, organic compounds which contain a polymerizable carbon-carbon double bond and have terminal hydroxyl groups should not be used as the dispersion stabilizer. Consequently, the process is simplified. For instance, there cannot be used, as the dispersion stabilizer of the invention, unsaturated group-containing polyether ester polyols as set out in Japanese Patent Publication No. 49-46556, modified polyols having at the end thereof an acryl group, a methacryl group, an allyl group or the like as set out in Japanese Patent Publication No. 58-26363, compounds obtained by reaction with maleic anhydride, allyl glycidyl ether or the like as set out in Japanese Laid-open Patent Application Nos. 51-17924 and 50-149778, and unsaturated bond-containing macromers consisting of a fumarate group as set out in Japanese Laid-open Patent Application No. 63-146912. The use of these compounds as the dispersion stabilizer can be determined by the presence or absence of an unreacted organic compound or the bonding derived from the compound.

According to the invention, the polymerization reaction may be conducted in a batchwise or continuous manner. The polymerization temperature is determined depending on the type of catalyst and is generally at a level not lower than the decomposition temperature of a catalyst, preferably 60°–200° C., and more preferably 90°–160° C. The polymerization reaction may be performed either in a pressurized system or in a normal pressure system.

After completion of the polymerization reaction, the resultant polymer-polyol may be used as it is as a starting material for polyurethane foams. Preferably, the polymer-polyol is used after removal of unreacted monomer, decomposition products of the catalyst and chain transfer agent by treatment under reduced pressure.

The polyurethane foam of the invention is obtained by reaction of polymer-polyols with polyisocyanates in the presence of foamers, catalysts, foam stabilizers and other additives. All the polymer-polyols stated hereinabove can be used, as they are, as the polymer-polyol for the foam. Other polyols may be used by mixing with the polymer-polyols. Such polyols should preferably be polyols as set forth hereinbefore.

The polyisocyanates used in the present invention include, for example, 2,4-tolylene diisocyanate, 2,6-tolylene diisocyanate, mixtures of both isocyanates at 80/20 by weight (80/20-TDI) and at 65/35 by weight (65/35-TDI), crude tolylene diisocyanate (crude TDI), 4,4'-diphenylmethane diisocyanate (4,4'-MDI), 2,4'-diphenylmethane diisocyanate (2,4'-MDI), 2,2'-diphenylmethane diisocyanate (2,2'-MDI), mixtures of diphenylmethane diisocyanate isomers (MDI), polymethylene polyphenyl isocyanate (crude MDI), toluidine diisocyanate, xylylene diisocyanate, hexamethylene diisocyanate, isophorone diisocyanate, dicyclohexylmethane diisocyanate, and carbodiimido-modified products, biuret modified products, dimers, trimers and prepolymers of these isocyanates. The polyisocyanates may be used singly or in combination.

The foaming agents used in the present invention include one or more of water, trichloromonofluoromethane, dichlorodifluoromethane, 2,2-dichloro-1,1,1-trifluoroethane, 1,1-dichloro-1-fluoroethane, methylene chloride, trichlorotrifluoroethane, dibromotetrafluoroethane, trichloroethane, pentane, n-hexane and the like.

The catalysts used in the present invention are known and are not critical. For instance, there may be mentioned amine catalysts such as triethylamine, tripropylamine, polyisopropanolamine, tributylamine, trioctylamine, hexamethyldimethylamine, N-methylmorpholine, N-ethylmorpholine. N-octadecylmorpholine, monoethanolamine, diethanolamine, triethanolamine, N-methyldiethanolamine, N,N-dimethylethanolamine, diethylenetriamine, N,N,N',N'-tetramethylethylenediamine, N,N,N',N'-tetramethylpropylenediamine, N,N,N',N'-tetramethylbutylenediamine, N,N,N',N'-tetramethyl-1,3-butylenediamine, N,N,N',N'-tetramethylhexamethylenediamine, bis[2-(N,N-dimethylamino)ethyl]ether, N,N-dimethylbenzylamine, N-N-dimethylcyclohexylamine, N,N,N',N'-pentamethyldiethylenetriamine, triethylenediamine formate and other salts of triethylenediamine, oxyalkylene adducts of amino groups of primary and secondary amines, aza cyclic compounds such as N,N'-dialkylpiperazines, various N,N',N''-trialkylaminoalkylhexahydrotriazines, and $\beta$-aminocarbonyl catalysts set out in Japanese Patent Publication No. 52-43517. Organometallic catalysts include tin acetate, tin octylate, tin oleate, tin laurate, dibutyl tin diacetate, dibutyl tin dilaurate, dibutyl tin dichloride, lead octanoate, lead naphthenate, nickel naphthenate. cobalt naphthenate and the like. These catalysts may be used singly or in combination. The amount is in the range of 0.0001-10.0 parts by weight per 100 pans by weight of compounds having active hydrogen.

The foam stabilizers used in the invention include known organosilicon surface active agents. For instance, there may be mentioned L-520, L-532, L-540, L-544, L-550, L-3550, L-3505, L-3600, L-3601, L-5305, L-5307, L-5309, L-5710, L-5720, L-5740M, L-6202 and the like of Nippon Unicar Co., Ltd., SH-190, SH-194, SH-200, SPX-253, PX-274C, SF-2961, SF-2962, SPX-280A, SPX-294A and the like of Tomy Silicone Co., Ltd., F-114, F-121, F-122, F-220, F-230, F-258, F-260B, F-317, F341, F-601, F-606, X-20-200, X-20-201 and the like of Shin-Etsu Silicone Co., Ltd., and B-4113 of Gold Schmidt Co., Ltd. The amount of these foam stabilizers is in the range of 0.1-5 parts by weight per 100 parts by weight in total of a compound having active hydrogen and a polyisocyanate.

In the practice of the invention, aside from the ingredients stated hereinbefore, general-purpose crosslinking agents, stabilizers, fillers, colorants and flame retardants may be used. The crosslinking agents used in the invention include monomeric polyols such as ethylene glycol, propylene glycol, diethylene glycol, triethylene glycol, and 1,3-butanediol, alkanolamines such as triethanolamine, diethanolamine and the like, aliphatic polyamines such as ethylenediamine, diethylenetriamine, triethylenetetramine and the like, aromatic polyamines such as methylenebisorthochloroaniline, 4,4'-diphenylmethanediamine, aniline, 2,4'-diphenylmethanediamine, aniline, 2,4'-tolylenediamine, 2,6'-tolylenediamine and the like, and compounds which are obtained by adding, to these active hydrogen compounds, ethylene oxide, propylene oxide or the like to have a hydroxyl number of 200 mg KOH/g or more.

The method for making a polyurethane foam according to the invention is described below. A polymer-polyol, other polyols, a foaming agent, a catalyst, a foaming stabilizer and other additives are mixed in predetermined amounts to obtain a resin solution. The amounts of the polyisocyanate, polyol and crosslinking agent are so determined that the ratio by equivalent between the NCO group in the polyisocyanate and the active hydrogen in the polyol and the crosslinking agent (NCO/H) is in the range of 0.70–1.40. The resin solution and the polyisocyanate are controlled at a predetermined temperature, for example, of 20°–30° C., followed by quick mixing and casting into a mold whose temperature is controlled at a temperature, for example, of 30°–70° C. The reaction mixture is foamed and filled in the mold and cured in an oven of a predetermined temperature, for example, of 60°–180° C. for a time, for example, of 30 seconds to 20 minutes, followed by removing the resulting foam to obtain an intended polyurethane foam.

The invention is described by way of examples.

1. PREPARATION OF POLYMER-POLYOLS.

EXAMPLE 1

A polyol was fully charged in a one liter autoclave equipped with a thermometer, an agitator and liquid feeders and heated to 120° C. under agitation. A mixture of polyol, an azobisisobutyronitrile (AIBN), acrylonitrile, styrene and triethylamine which had been preliminarily mixed at ratios indicated in Table 1 was continuously charged and the resultant polymer-polyol was continuously obtained from a discharge port. The reaction pressure was set at 3.5 kg/cm$^2$ and the residence time was 50 minutes. The thus obtained polymer-polyol was subjected to suction treatment under conditions at 120° C. and 20 mm Hg fox; 4 hours under reduced pressure. thereby removing unreacted monomer and triethylamine. The residual amounts of the unreacted monomer and triethylamine were determined by gas chromatography, revealing that styrene was detected in an amount of 80 ppm with acrylonitrile and triethylamine being not detected at all. The amine value was determined in an acetic acid solvent by titration by neutralization with perchloric acid, revealing a value of 1.33 mg KOH/g. Methanol was added to the polymer-polyol, followed by sufficient dispersion and centrifugal separation. Thereafter. the weight of a methanol-insoluble matter was measured to determine a concentration of the polymer of 43 wt %. According to the thermal analysis (DSC-7, available from Perkin-Elmer Co., Ltd.

nitrogen atmosphere, heating rate of 20° K./minute), the glass transition temperature of the polymer in the polymer-polyol was found to be 98° C. The results are shown in Table 1.

EXAMPLES 2–5 AND COMPARATIVE EXAMPLES 1–5

The general procedure of Example 1 was repeated. The results are shown in Tables 1 and 2.

TABLE 1

| | Example | | | | |
|---|---|---|---|---|---|
| | 1 | 2 | 3 | 4 | 5 |
| Polyol P | 52.9 | 52.9 | 52.9 | 23.3 | — |
| Polyol Q | — | — | — | 23.3 | 65.1 |
| Acrylonitdie | 37.6 | 37.6 | 37.6 | 43.5 | 34.9 |
| Styrene | 9.5 | 9.5 | 9.5 | 8.9 | — |
| AIBN | 0.2 | 0.2 | 0.2 | 0.2 | 0.4 |
| Chain transfer agent | | | | | |
| Kind | TEA | DEAE | N-methyl-morpholine | TEA | TEA |
| Amount | 4.0 | 4.6 | 4.0 | 4.0 | 2.9 |
| Hydroxyl Number (mg KOH/g) | 33.0 | 33.3 | 31.7 | 27.7 | 24.0 |
| Viscosity (cps/25° C.) | 2635 | 2715 | 3700 | 2900 | 7300 |
| Polymer Concentration (wt %) | 43 | 43 | 43 | 47 | 33 |
| Residual amount of Amine (ppm) | — | 10 | 18 | — | — |
| Amine Number (mg KOH/g) | 1.33 | 3.40 | 1.65 | 2.35 | 1.00 |
| Glass transition point (°C.) | 96 | 97 | 100 | 102 | 95 |

NOTE: Polyol P: Polyoxypropyleneoxydiethylenetriol obtained by addition polymerization of propylene oxide and then ethylene oxide to glycerine (hydroxyl number: 55 mg KOH/g).
Polyol Q: Polyoxypropyleneoxyethylenetriol obtained by addition polymerization of propylene oxide and then ethylene oxide to glycerine (OH number: 33 mg KOH/g).
TEA: triethylamine.
DEAE: N,N-diethylethanolamine.
Numerical values are parts by weight.

TABLE 2

| | Comparative Example | | | | |
|---|---|---|---|---|---|
| | 1 | 2 | 3 | 4 | 5 |
| Polyol P | 23.3 | — | 75.8 | 52.9 | 52.9 |
| Polyol Q | 23.3 | 65.1 | — | — | — |
| Acrylonitrile | 37.6 | 34.9 | 18.8 | 37.6 | 37.6 |
| Styrene | 9.5 | — | 5.4 | 9.5 | 9.5 |
| AIBN | 0.2 | 0.4 | 0.3 | 0.2 | 0.2 |
| Chain transfer agent | | | | | |
| Kind | — | — | — | IPA | IPA |
| Amount | — | — | — | 4.0 | 10 |
| Hydroxyl Number (mg KOH/g) | 28.4 | 23.5 | 41.0 | 33.1 | 33.0 |
| Viscosity (cps/25° C.) | 11000 | 35000 | 1600 | 7500 | 5000 |
| Polymer Concentration (wt %) | 44 | 35 | 24 | 43 | 43 |
| Residual amount of Amine (ppm) | — | — | — | — | — |
| Amine Number (mg KOH/g) | 0.01 | — | — | — | — |
| Glass transition point (°C.) | 125 | 123 | 112 | 125 | 122 |

NOTE: Polyol P: Polyoxypropyleneoxydiethylenetriol obtained by addition polymerization of propylene oxide and then ethylene oxide to glycerine (hydroxyl number: 55 mg KOH/g).
Polyol Q: Polyoxypropyleneoxyethylenetriol obtained by addition polymerization of propylene oxide and then ethylene oxide to glycerine (hydroxyl number: 33 mg KOH/g).
IPA: isopropyl alcohol.
Numerical values are parts by weight.

2. EVALUATION OF FOAMING

The polymer-polyols obtained in Example 1 and Comparative Example 3 were, respectively, designated as Polymer Polyol A and Polymer Polyol B. Polyoxypropyleneoxyethylenetriol (Polyol P) having a hydroxyl number of 55 mg KOH/g, 4g of Silicone L-5305 (Nippon Unicar Co., Ltd., 1 g of Dabco 33 LV (solution of 33% triethylene aliamine in dipropylene glycol), and 14.2 g of water were mixed under agitation to prepare a resin solution. The solution to which 0.35 g of T-9 (stannous octylate) was further added, and a mixture of 80/20 TDI having a ratio by equivalent between the NCO group and active hydrogen of 1.05 were, respectively, controlled at 25° C., and were quickly mixed under agitation, followed by immediate casting into an aluminum mold (400 mm × 400 mm × 100 mm) at 37° C. and curing in a hot air oven at 160° C. for 13 minutes. The physical properties of the resultant foams are shown in Table 3.

TABLE 3

| | Foaming Test 1 | Foaming Test 2 | Foaming Test 3 |
|---|---|---|---|
| Polymer-polyol A (g) | 160 | 0 | 0 |
| Polymer-polyol B (g) | 0 | 270 | 160 |
| Polyol P (g) | 200 | 90 | 200 |
| Rise time (seconds) | 87 | 83 | 86 |
| Reaction curability *1 | ⊙ | ○ | ○ |
| Overall density (kg/m3) | 39.3 | 39.1 | 39.2 |
| Hardness 25% ILD *2 (kg/314cm2) | 25.0 | 24.1 | 19.6 |
| Tensile strength | 1.78 | 1.58 | 1.28 |
| Elongation | 115 | 112 | 115 |
| Tensile strength | 0.83 | 0.80 | 0.68 |
| Permanent strain 50% wet (%) | 15.4 | 17.0 | 15.8 |

NOTE: The mark ⊙ means deformation ring not observed on touch with fingers after removal from the mold (curing time: 11 minutes).
The mark ○ means deformation being not observed on touch with fingers after removal from the mold (curing time: 13 minutes).

Comparison between the foaming Tests 1 and 2

The Polymer Polyol A obtained in Example 1 can yield, in smaller amounts, a polyurethane foam which has similar physical properties as that obtained from Polymer Polyol B of Comparative Example 3. The use of Polymer Polyol A obtained in Example 1 can shorten the curing time with improved moldability.

Comparison between the foaming Tests 1 and 3

When the Polymer Polyol A obtained in Example 1 and the Polymer Polyol B obtained in Comparative Example 3 are used in equal amounts, the polyurethane foam obtained using the former polymer-polyol has excellent physical properties typical of which are hardness and tensile strength.

The polymerization of an ethyleneically unsaturated monomer in a polyol, which is free of any polymenzable carbon-carbon double bond, in the presence of an alkyl-substituted tertiary amine serving as a chain transfer agent ensures polymer-polyols which are lower in viscosity and better in dispersion stability. The resultant polymer-polyol has good reaction curability on foaming and can provide polyurethane forms with good physical properties such as hardness.

We claim:

1. A polyurethane foam prepared by reacting (a) a high concentration-low viscosity polymer-polyol obtained by polymerizing an ethylenically unsaturated monomer in a polyoxyalkylene polyol, which is free of any polymerizable carbon-carbon double bond, in the presence of an alkyl-substituted tertiary amine as a chain transfer agent wherein the amount of the ethylenically unsaturated monomer is in the range of from 33 to 60 wt. % based on the total of the polyoxyalkylene polyol and the monomer and the amount of the chain transfer agent is in the range of from 0.5 to 30 parts by weight per 100 parts by weight of the ethylenically unsaturated monomer, and (b) a polyisocyanate, said reacting being conducted in the presence of a foaming agent, a catalyst, and a foam stabilizer.

2. The polyurethane foam of claim 1 wherein the ethylenically unsaturated monomer is at least one member selected from the group consisting of acrylonitrile, methacrylonitrile, styrene, methylstyrene and phenylstyrene.

3. The polyurethane foam of claim 2 wherein the ethylenically unsaturated monomer is a mixture of acrylonitrile and styrene.

4. The polyurethane foam of claim 1 wherein the ethylenically unsaturated monomer is acrylonitrile.

5. The polyurethane foam of claim 1 wherein the polymer in the polymer-polyol has a glass transition temperature in the range of 90°–120° C. when determined by differential thermal analysis in an atmosphere of nitrogen under conditions of a heating rate of 10~20 K/minute.

6. The polyurethane foam of claim 1 wherein the polyisocyanate is at least one member selected from the group consisting of tolylene diisocyanate, diphenylmethane diisocyanate, polymethylene polyphenyl isocyanate, toluidine diisocyanate, xylylene diisocyanate, hexamethylene diisocyanate, isophorone diisocyanate, and dicyclohexylmethane diisocyanate.

7. The polyurethane foam of claim 6 wherein the polyisocyanate is tolylene diisocyanate.

8. The polyurethane foam of claim 1 wherein the foaming agent is at least one member selected from the group consisting of trichloromonofluoromethane, dichlorodifluoromethane, 2,2-dichloro-1,1,1-trifluoroethane, 1,1-dichloro-1-fluoroethane, methylene chloride, trichlorotrifluoroethane, dibromotetrafluoroethane, trichloroethane, pentane, and n-hexane.

9. The polyurethane foam of claim 1 wherein the catalyst is at least one member selected from the group consisting of an amine catalyst and an organometallic catalyst.

10. The polyurethane foam of claim 1 wherein the foam stabilizer is an organosilicon surface active agent.

11. The polyurethane foam of claim 1 wherein the foam further comprises at least one member selected from the group consisting of crosslinking agents, fillers, colorants, and flame retardants.

* * * * *